United States Patent
Abuelsaad et al.

(10) Patent No.: US 11,055,333 B2
(45) Date of Patent: Jul. 6, 2021

(54) MEDIA SEARCH AND RETRIEVAL TO VISUALIZE TEXT USING VISUAL FEATURE EXTRACTION

(71) Applicant: International Business Machines Corporation, Armonk, NY (US)

(72) Inventors: Tamer E. Abuelsaad, Armonk, NY (US); Ayush Shah, Gurgaon (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 220 days.

(21) Appl. No.: 16/242,326

(22) Filed: Jan. 8, 2019

(65) Prior Publication Data
US 2020/0218778 A1    Jul. 9, 2020

(51) Int. Cl.
G06F 16/34      (2019.01)
G06F 16/31      (2019.01)
G06F 16/538     (2019.01)
G06F 40/253     (2020.01)

(52) U.S. Cl.
CPC .......... *G06F 16/34* (2019.01); *G06F 16/313* (2019.01); *G06F 16/538* (2019.01); *G06F 40/253* (2020.01)

(58) Field of Classification Search
None
See application file for complete search history.

(56) References Cited

U.S. PATENT DOCUMENTS

2006/0080306 A1* 4/2006 Land ............... G06F 16/58
2009/0313239 A1 12/2009 Wen et al.
2010/0036829 A1* 2/2010 Leyba ............... G06F 16/3344
                                                        707/739
2013/0188887 A1 7/2013 Chan et al.
2014/0136323 A1* 5/2014 Zhang ............... G06Q 30/0255
                                                        705/14.53
2015/0019205 A1* 1/2015 Jiang ............... G06F 16/93
                                                        704/9

(Continued)

FOREIGN PATENT DOCUMENTS

CN    103593337 A    11/2013
WO    2016153510 A1   3/2015

OTHER PUBLICATIONS

Tanmay Gupta et al., Imagine This! Scripts to Compositions to Videos, Apr. 10, 2018.

(Continued)

*Primary Examiner* — Antim G Shah
(74) *Attorney, Agent, or Firm* — Garg Law Firm, PLLC; Rakesh Garg; Joseph Petrokaitis

(57) ABSTRACT

A processor extracts a sentence from a portion of text. The sentence includes one or more words. A concreteness score is determined for each word in the sentence. A set of concrete words is determined based upon a comparison of the concreteness score for each word and a predetermined threshold. A grammatical dependency relationship is determined between the one or more words of the sentence. One or more subsets of search terms is determined based upon the grammatical dependency relationship. Each member of the one or more subsets of search terms is a member of the set of concrete words. One or more images is retrieved from a repository based on the one or more subsets of search terms.

16 Claims, 8 Drawing Sheets

(56) References Cited

U.S. PATENT DOCUMENTS

2015/0089335 A1    3/2015  Jorneev
2017/0004129 A1*  1/2017  Shalaby ................ G06F 16/367
2017/0161365 A1*  6/2017  Joshi ..................... G06F 40/211
2019/0392066 A1*  12/2019  Kim ........................ G06F 40/35

OTHER PUBLICATIONS

My Simple Show, https://www.mysimpleshow.com/, 2018.
Adobe Sensei, Unified Artificial Intelligence and Machine Learning, https://www.adobe.com/in/sensei.html 2018.
Tamer Abuelsaad, et at., Grace Period Disclosure, Content Curation for Micro Learning using Human-in-the-Loop AI techniques, Nov. 9, 2017.
Moments, Moments in Time, http://moments.csail.mit.edu/explore.html, 2018.

* cited by examiner

MEDIA SEARCH AND RETRIEVAL TO VISUALIZE TEXT USING VISUAL FEATURE EXTRACTION

TECHNICAL FIELD

The present invention relates generally to a method, system, and computer program product for media search and retrieval. More particularly, the present invention relates to a method, system, and computer program product for media search and retrieval to visualize text using identified grammatical dependency relationships.

BACKGROUND

An image retrieval system is a computer system for browsing, searching, and retrieving images from a database of digital images such as an image repository. A common method for retrieving images from an image repository is to add metadata descriptive of an image to image data within the image repository, searching the image repository based upon the metadata, and retrieving images based upon the search. Examples of metadata include captioning, keywords, or other descriptions. To search images from an image repository, a user may provide query terms such as a keyword and the system may return images similar to the query. Another method of image retrieval uses content-based image retrieval in which images are retrieved from an image repository based on similarities in their contents (e.g., textures, colors, or shapes) to a user-supplied query image or user-specified image features.

SUMMARY

The illustrative embodiments provide a method, system, and computer program product. An embodiment of a computer-implemented method includes extracting, by a processor, a sentence from a portion of text, the sentence including one or more words. The embodiment further includes determining a concreteness score for each word in the sentence, and determining a set of concrete words based upon a comparison of the concreteness score for each word and a predetermined threshold. The embodiment further includes determining a grammatical dependency relationship between the one or more words of the sentence. The embodiment further includes determining one or more subsets of search terms based upon the grammatical dependency relationship. In the embodiment, each member of the one or more subsets of search terms is a member of the set of concrete words. The embodiment further includes retrieving media from a repository based on the one or more subsets of search terms.

In an embodiment, determining the set of concrete words further includes determining that the concreteness score for a word is above the predetermined threshold value, and determining the set of concrete words based on the concreteness scores for a word from the sentence having a concreteness score above the predetermined threshold.

In an embodiment, determining the grammatical dependency relationship further includes determining one or more of a noun phrase from the words of the sentence or a prepositional phrase from the words of the sentence.

An embodiment further includes identifying at least one word of the noun phrase as being found in the set of concrete words. An embodiment further includes identifying at least one word of the prepositional phrase as being found in the set of concrete words.

An embodiment further includes merging an overlap of the noun phrase and the prepositional phrase into a merged phrase. In an embodiment, merging the overlap of the noun phrase and the prepositional phrase further includes substituting a portion of the prepositional phrase with a portion of the noun phrase.

In an embodiment, determining the one or more subsets of search terms further includes constructing a prioritized query tree based upon one or more of the noun phrases or the prepositional phrases. In an embodiment, retrieving the media from the repository further includes searching the repository by traversing the prioritized query tree based on a threshold number of search results, and receiving, responsive to the searching, one or more search results from the repository.

An embodiment further includes determining a representative media from the one or more search results, the representative media corresponding to a contextual meaning of the portion of text. In an embodiment, the media includes one or more images.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts an example prioritized query tree for a sentence in accordance with an illustrative embodiment;

DETAILED DESCRIPTION

Figure 1:
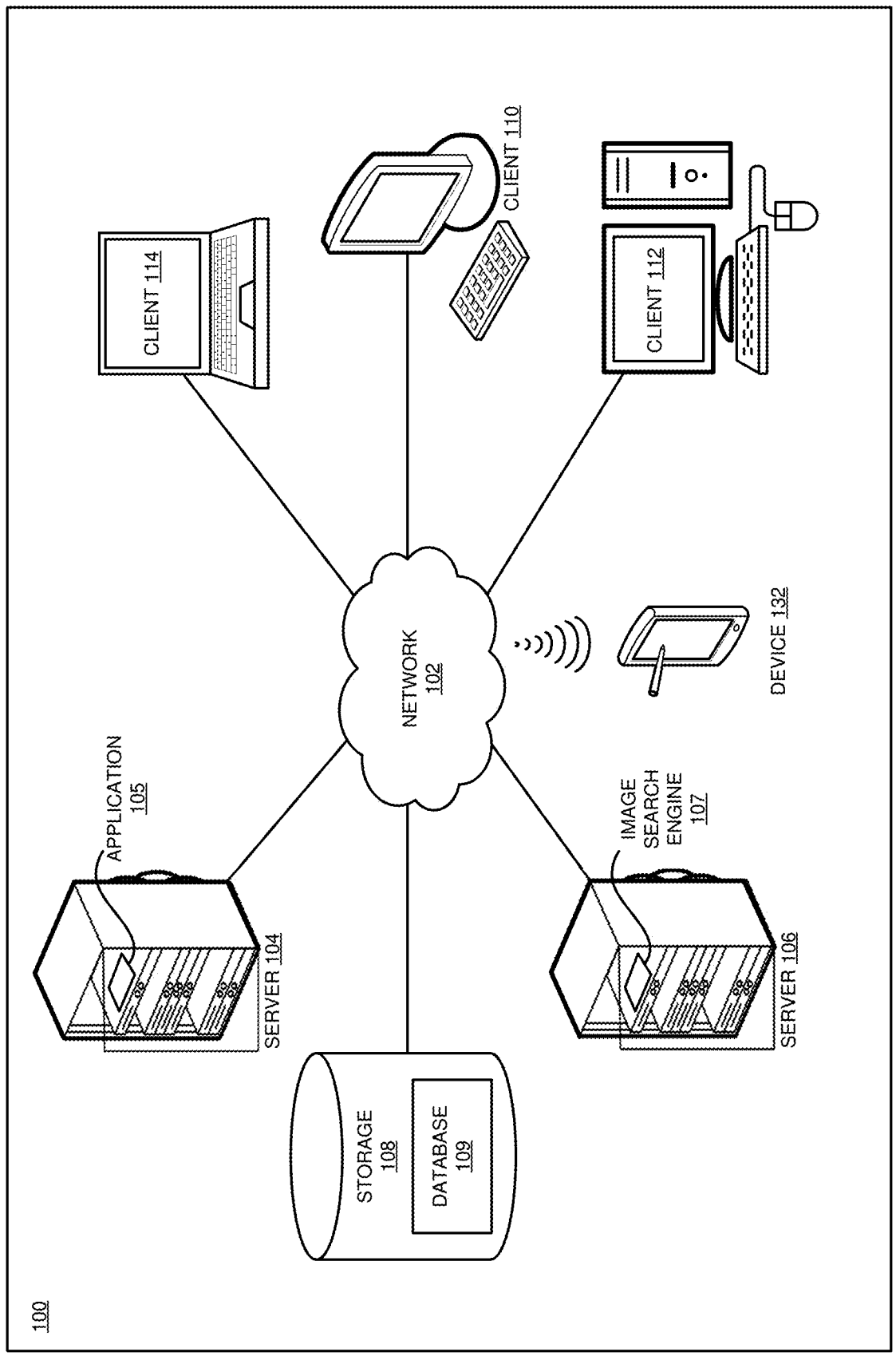
FIG. 1 depicts a block diagram of a network of data processing systems in which illustrative embodiments may be implemented.

The illustrative embodiments described herein are directed to image search and retrieval to visualize text using identified grammatical dependency relationships. Embodiments recognize that people often learn more efficiently from viewing images as compared to just reading text, especially for early education and for primary education in general. Embodiments further recognize that transforming a block of educational text into a video, illustration, or other image representation is often an expensive and time-consuming process.

A sentence represents a set of words that convey a concept in a complete way. The set of words used in a given language can be concrete or abstract. An example of a concrete word is "snake", and an example of an abstract word is "participate". The more concrete a words is, the more visualizable it is. Concrete words are sometimes referred to as imagable words. For example, a search of an image repository for the word "participate" could yield an overwhelming number of pictures that do not represent the context in which the word "participate" is used in the sentence. For example, "participate in sports" does not represent the same context as "participate in band practice". Further, if one was to pick words at random or frequently used words from a sentence and search an image repository using the word, the returned image results may still not properly represent the sentence.

Concrete words are typically paired with abstract words in order to help the reader understand concept(s) being conveyed. Identifying the concrete words and using them as the center for extracting other keywords near them (e.g., words that support concrete words) yields contextually significant visual results. A concreteness score is a measure (e.g., on a scale of 1 to 5) of how imagable a concept represented by a given word is. Lists of concreteness scores for particular words are known. Further, machine learning based algorithms exist for assigning concreteness scores for words. One or more embodiments are directed to identifying words and word changes in a text sentence, ordering the word chains by importance, and using the word chains for image search queries. In various embodiments described herein the terms "word chains" and "word phrases" are used interchangeably to indicate a sequence of one or more words together as one entity.

An embodiment of a system for retrieving images to visualize text includes receiving a portion of text, and extracting at least one sentence from the text. In the embodiment, the system determines a concreteness score for each word in the sentence, and determines whether the concreteness score for a word is above a predetermined concreteness score threshold. In a particular embodiment, the predetermined concreteness score threshold is configurable by a user as the lowest acceptable concreteness score. In the embodiment, the system determines a set of concrete words based on the concreteness scores wherein each member of the set of concrete words is a word from the sentence having a concreteness score above the predetermined threshold. In the embodiment, the system determines a grammatical dependency relationship of the words within the sentence. In one or more embodiments, a grammatical dependency relationship includes a functional relationship between grammatical features in a sentence such as between noun phrases and prepositional phrases. Although various embodiments are described with respect to determining grammatical dependency relationships within a sentence, other embodiments may include extracting other visual features from text for visualizing a concept and/or context within the text. In one or more embodiments, a visual feature of a portion of text includes a feature associated with the text, such as a grammatical dependency relationship, that is extracted to determine a concept and/or context expressed by the text that may be visualized by media (e.g., images or video).

In the embodiment, system determines one or more subsets of search terms based upon the grammatical dependency relationship, in which each member of the one or more subsets is a member of the set of concrete words, and wherein the system determines the one or more subsets based upon the grammatical dependency relationship of the words within the sentence. In the embodiment, the system searches an image repository based upon the set of concrete words and the one or more subsets of search terms, and retrieves one or more images from an image repository based on the set of concrete words and the one or more subsets of search terms while adhering to the contextual and/or semantic meaning of the text.

Although various embodiments described herein are directed to image search and retrieval as a non-limiting example, it should be understood that other embodiments may include visual feature extraction from sentence phrases for visualizing text using any type of media including images and video.

An embodiment can be implemented as a software application. The application implementing an embodiment can be configured as a modification of an existing image retrieval system or platform, as a separate application that operates in conjunction with an existing image retrieval or platform, a standalone application, or some combination thereof.

The illustrative embodiments are described with respect to certain types of tools and platforms, procedures and algorithms, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
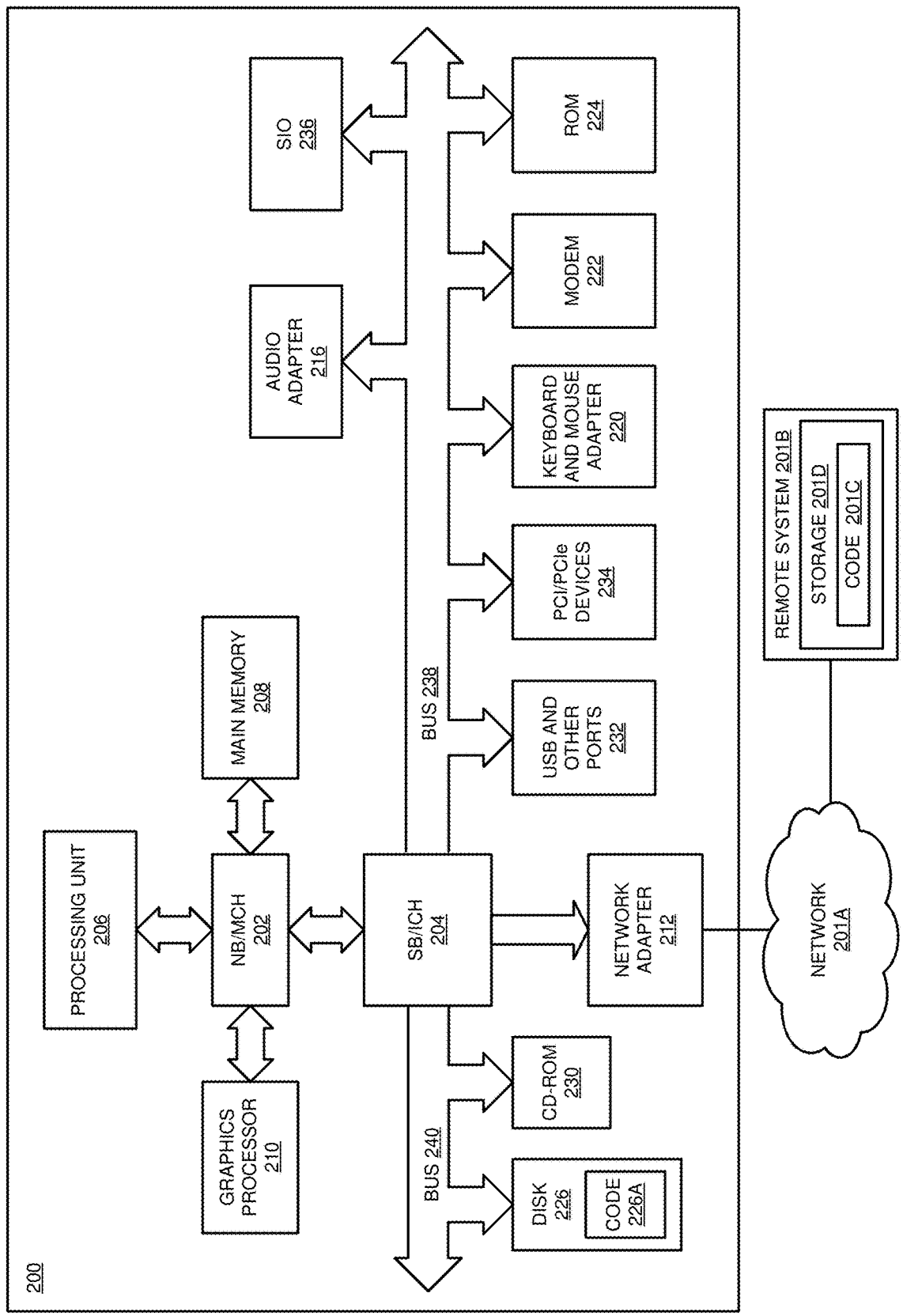
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage device 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage device 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for image search and retrieval to visualize text using identified grammatical dependency relationships in accordance with one or more embodiments.

Server 106 includes an image search engine 107 configured to search images from one or more image repositories response to a query as described herein with respect to various embodiments. Storage device 108 includes one or more databases 109 configured to store image data in an image repository as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as device 132 or server 104 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
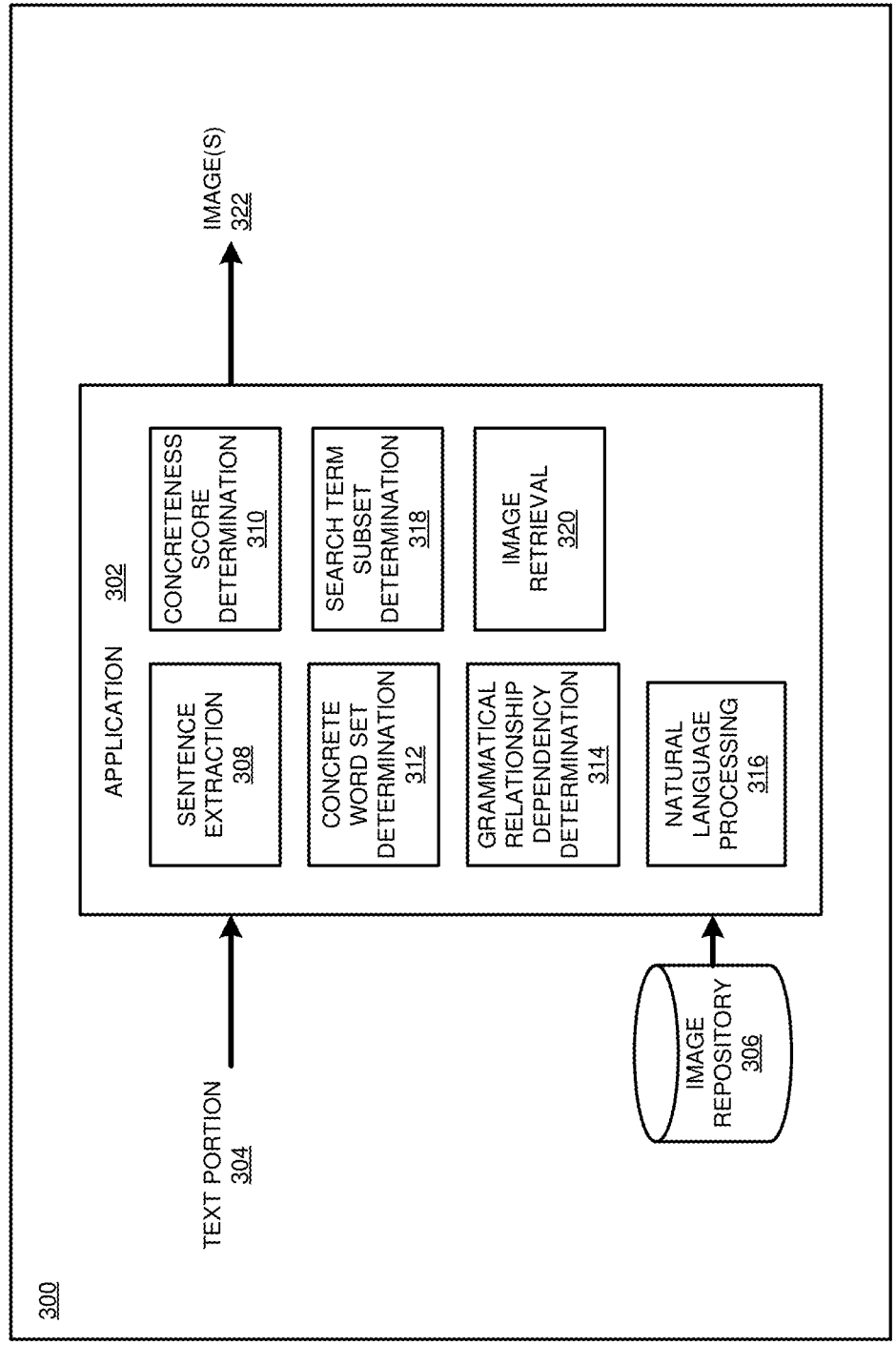
FIG. 3 depicts a block diagram of an example configuration for image search and retrieval to visualize text using identified grammatical dependency relationships in accordance with an illustrative embodiment.

With reference to FIG. 3, this figure depicts a block diagram of an example configuration 300 for image search and retrieval to visualize text using identified grammatical dependency relationships in accordance with an illustrative embodiment. The example embodiment includes an application 302. In a particular embodiment, application 302 is an example of application 105 of FIG. 1.

Application 302 receives a text portion 304 including textual information representing a concept and/or context which is desired to be visualized by one or more images retrieved from an image repository 306 as described herein with respect to one or more embodiments. In a particular embodiment, image repository 306 is an example of an image repository stored within database 109 of storage device 108.

Application 302 includes a sentence extraction component 308, a concreteness score determination component 310, a concrete word set determination component 312, a grammatical relationship dependency determination component 314, a natural language processing component 316, a search term subset determination component 318, and an image retrieval component 320.

In the embodiment, sentence extraction component 308 is configured to extract one or more sentences from text portion 304 in which each sentence includes one or more words. Concreteness score determination component 310 is configured to determine a concreteness score for each word. In a particular embodiment, concreteness score determination component 310 may be configured to retrieve a list of words and associated concreteness scores, match one or more of the extracted words to a word in the list, and assigning each of the extracted words with the concreteness score associated with the matching word from the list. Table I lists examples of words in which each word has an associated concreteness score, and an identified part-of-speech (POS). In the examples of Table I, a higher concreteness score is representative of a greater imageability of the word. In another particular embodiment, concreteness score determination component 310 may be configured to heuristically calculate or determine the concreteness scores using a known algorithm.

TABLE I

Example Concreteness Scores

| Word | Concreteness Score | Part-Of-Speech |
|---|---|---|
| sled | 5 | Adjective |
| plunger | 4.96 | Adjective |
| human | 4.93 | Adjective |
| waterbed | 4.93 | Adjective |
| cymbal | 4.92 | Adjective |
| dogsled | 4.89 | Adjective |
| chubby | 3.76 | Adjective |
| unclick | 2.83 | Verb |
| worked | 2.83 | Verb |
| Priced | 2.88 | Verb |

Concrete word set determination component 312 is configured to determine a set of concrete words based on the concreteness scores. In a particular embodiment, concrete word set determination component 312 is configured to compare each concreteness score to a predetermined threshold and select each word having an associated concreteness score above the threshold value as a concrete word within the set of concrete words.

Grammatical relationship dependency determination component 314 is configured to determine a grammatical dependency relationship of the words within the sentence. In particular embodiments, the grammatical dependency relationships include noun relationships, prepositional relationships, and conjunction relationships between the words of the sentences. Although particular embodiments are described with respect to noun relationships, prepositional relationships, and conjunction relationships, it should be understood that in other embodiments, grammatical relationship dependency determination component 314 may be configured to determine other grammatical dependency relationships that utilize identified concrete words. In one or more embodiments, grammatical relationship dependency determination component 314 is configured to determine grammatical dependency relationships using natural language processing provided by natural language processing component 316.

Search term subset determination component 318 is configured to determine one or more subsets of search terms based upon the one or more grammatical dependency relationships between the words of the sentence in which each member of the one or more subsets is a member of the set of identified concrete words. Image retrieval component 320 is configured to search image repository 306 based upon the set of concrete words and the one or more subsets of search terms, and retrieves one or more images 322 from image repository 306 based on the set of concrete words and the one or more subsets of search terms as further described herein.

Figure 4:
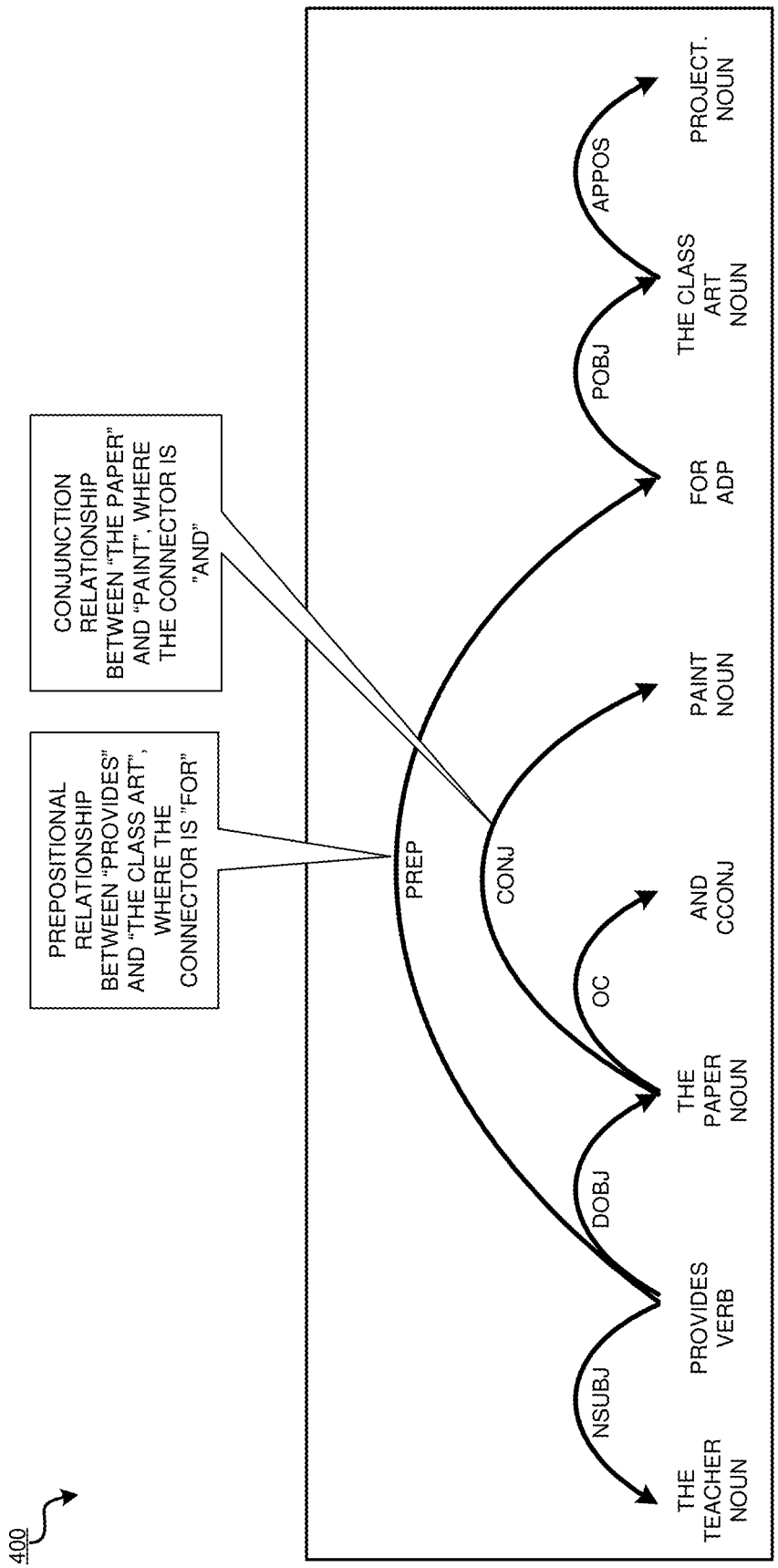
FIG. 4 depicts an example grammatical dependency tree for a sentence in accordance with an illustrative embodiment.

With reference to FIG. 4, this figure depicts an example grammatical dependency tree 400 for a sentence in accordance with an illustrative embodiment. In the embodiment, an example sentence of "The teacher provided the paper and paint for the class art project." is illustrated. The phrases "The teacher", "the paper", "paint", "the class art" and "project" are each identified as noun POSs in the sentence. The word "provides" is identified as a verb POS. The word "and" is identified as a coordinating conjunction (CCONJ) part of speech. The word "for" is identified as an ad positional phrase (ADP) POS. An ad positional phrase is a syntactic category that includes prepositional phrases, postpositional phrases, and circumpositional phrases.

In the example of FIG. 4, "The teacher" is the subject noun (nsubj) of the verb "provides", and "the paper" is the direct object (dobj) of "provides". FIG. 4 further illustrates a prepositional relationship between "provides" and "the class art" (a noun) where the connector is the word "for", and a conjunction relationship between "the paper" (a noun) and "paint" (a noun) where the connector is "and". FIG. 4 further illustrates "the class art" (a noun) as a propositional object of "for", and "project" as an appositive phrase of "the class art".

Figure 5:
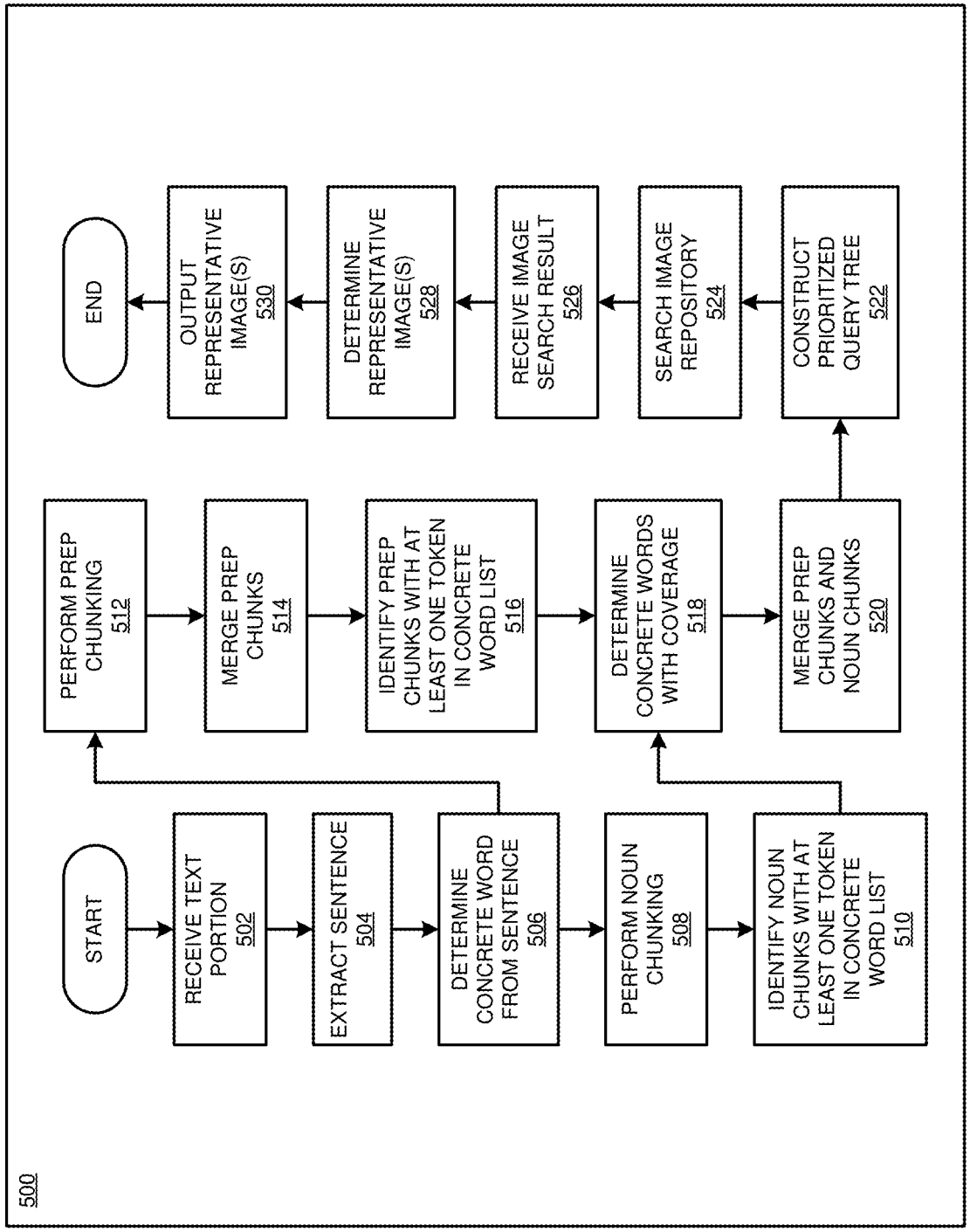
FIG. 5 depicts a flowchart of an example process for image search and retrieval to visualize text using identified grammatical dependency relationships in accordance with an illustrative embodiment.

With reference to FIG. 5, this figure depicts a flowchart of an example process 500 for image search and retrieval to visualize text using identified grammatical dependency relationships in accordance with an illustrative embodiment. In block 502, application 105 receives a text portion including textual information representing a concept and/or context which is desired to be visualized by one or more images. In block 504, application 105 extracts a sentence from the text portion including one or more words. In a particular embodiment, application 105 extracts the sentence from the text portion using NLP techniques. In one or more embodiments, application 105 lemmatizes the words of the sentence to ensure that only root words remain. Lemmatization is a standard NLP pre-processing technique to reduce inflectional forms and sometimes derivationally related forms of a word to a common base form. For example, "am", "are", and "is" may be converted to a common lemmatized form of "be". In another example, "car", "cars", "car's", and "cars'" may be converted to a common lemmatized form of "car".

In block 506, application 105 determines one or more concrete words from the sentence. In one or more embodiments, application 105 determines the one or more concrete words by determining a concreteness score for each word in the sentence, determining whether the concreteness score for a word is above a predetermined concreteness score threshold value, and determining that a word is a concrete word responsive to determining that the concreteness score for the word is above the predetermined concreteness threshold value. In an example, a sentence of "The teacher provides the paper and paint for the class art project." may include identified concrete words of "teacher", "paper", "paint", "class", "art", and "project".

In block 508, application 105 performs noun chunking to determine one or more noun chunks within the concrete words. A noun chunk is a noun phrase that has a noun as its head and often functions as a verb subject and objects, predicative expressions, and complements of prepositions. The noun phrase includes a noun (e.g., a person, place, or thing) and the modifiers that distinguish the noun. In block 510, application 105 identifies only noun chunks with at least one token in the concrete word list, i.e., noun chunks with at least one word in the noun chunk being found in the concrete word list.

For example, for a sentence of "Autonomous cars shift insurance liability toward manufacturers.", "Autonomous cars" and "insurance liability" are noun phrases. However, in an embodiment application 105 may only select a noun phrase that is in the concrete set of words. Accordingly, the noun phrase "insurance liability" may not be selected by application 105 for not having a high enough concreteness score. The noun chunking procedure identifies one or more noun phrases and an association of dependency relations from the same clause but may exclude some relations such as conjunctions and coordinating conjunctions.

In the noun chunking procedure, application 105 further identifies noun phrases with associated same clause relations which includes a noun with any of the related relations such as an adjective or verb. For example, for the sentence ""Autonomous cars shift insurance liability toward manufacturers.", application 105 may select "Autonomous cars shift" as an associated noun phrase chunk.

In the example sentence of "The teacher provides the paper and paint for the class art project.", application 105 determines that noun chunks include "provide,paper", "paint", "provide,teacher", "paper", "provide,paint", "teacher", "project,art,class".

In block 512, application 105 performs prepositional relationship chunking on the concrete word list. In one or more embodiments, prepositional relationship chunking includes identifying a triple set of words that has a prepositional relationship and dropping the actual preposition word (e.g., "as", "of", "for") due to the prepositional word being a stop word.

Figure 7:
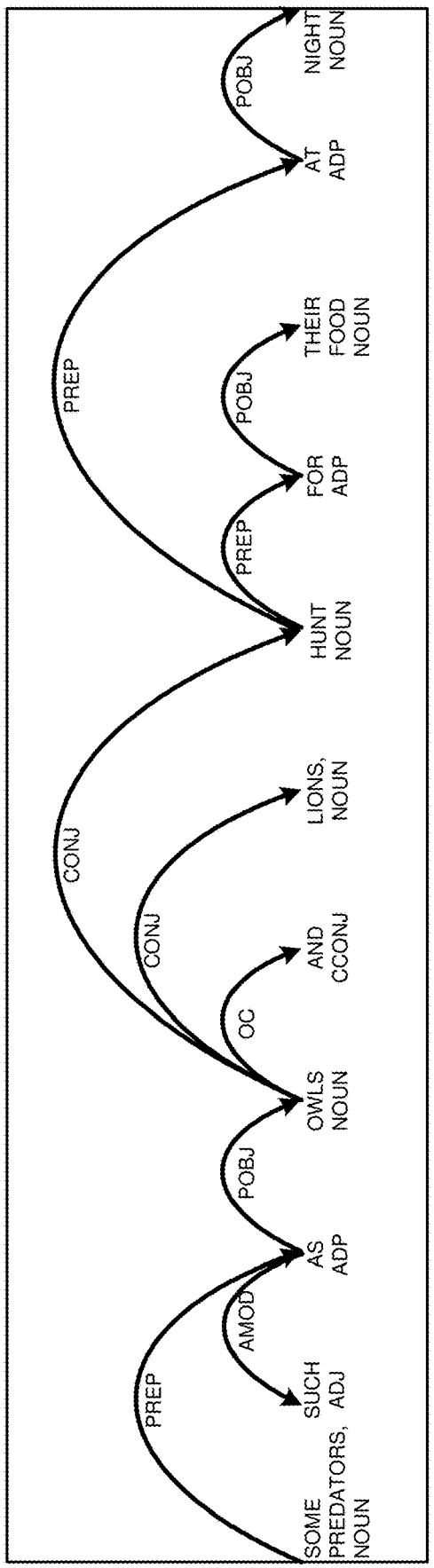
FIG. 7 depicts an example prepositional relationship chunking for a sentence in accordance with an illustrative embodiment.

With reference now to FIG. 7, this figure depicts an example prepositional relationship chunking 700 for a sentence in accordance with an illustrative embodiment. FIG. 7 illustrates an example sentence of "Some predators, such as owls and lions, hunt for their food at night." Prepositional relationship chunking around the prepositions and ignoring stop words yields the phrases "predator owl", "hunt food", and "hunt night".

Another item that application 105 considers during prepositional relationship chunking is conjunctions. In the example of FIG. 7, "lion" and "hunt" are both conjunctional with "owl". Whatever relationships application 105 identifies to "owl" will also be applied to "lion" and "hunt" resulting in the phrases "predator owl", "predator lion", "predator hunt", "hunt food", and "hunt night". For the example sentence "The teacher provided the paper and paint for the class art project.", prepositional chunks include "provide" and "project."

Returning again to FIG. 5, in block 514 application 105 merges overlapping prepositional chunks and creates triples from the merged chunks. In the example of FIG. 7, merged prepositional chunks include "predator owl", "predator lion", "predator hunt night", "predator hunt food", and "hunt food night". In another example of merging prepositions for overlap includes "basket ball, middle" and "middle, court" being merged to yield "basketball middle court".

In block 516, application 105 identifies only preposition chunks with at least one token in the concrete word list, i.e., preposition chunks with at least one word in the noun chunk being found in the concrete word list. In block 518, application 105 determines the concrete words with coverage in the noun chunks and preposition chunks, i.e., the noun chunks and preposition chunks with at least one word in the concrete word list.

In block 520, application 105 merges any overlap between the prepositional chunks and noun chunks in which for each prepositional chunk, application 105 determines if the prepositional chunk can use a substitution from the noun chunks. For example, for a noun chunk of "bake sale" and a preposition chunk of "sale year", merging of the noun chunk and preposition chunk yields an output of "bake sale year". In another example, if a noun phrase is "autonomous car" and "charge car battery" is a prepositional phrase, a merged output would yield "charge autonomous car battery". In an example sentence of "The teacher provided the paper and paint for the class art project.", merged noun chunks and prepositional chunks may include "provide, paper,teacher", "provide,paper", "provide,project", "paint", "provide,project,teacher", "provide,teacher", "provide,project,paint", "provide,paint,paper", "provide,project,paper", "provide,paint,teacher", "provide,project,art,class", "provide,paint", "teacher", "project,art,class", and "paper". In an embodiment, application 105 may further trim the merged chunks to remove sub chunks to yield, trimmed merged chunks of "provide,paper,teacher", "provide,project, teacher", "provide,project,paint", "provide,paint,paper", "provide,project,paper", "provide,paint,teacher", "provide, project,art,class".

In an embodiment, a user may configure the merging of the noun chunks and prepositional chunks to be optional. For example, if the user prefers smaller phrases, the user can disable merging of the noun chunks and prepositional chunks.

In block 522, application 105 constructs a prioritized query tree based upon the merged noun chunks and prepositional chunks to determine which phrases should be used to represent visualizing the text portion and a priority order of searching. In an embodiment, a prioritized query tree includes three levels of searching query priority including in descending priority: (1) all concrete words as one query; (2) each grammatical dependent relationship phrase, including overlapping mergers and non-overlapping in a separate query; and (3) each of the words/phrases used to create phrases in (2) as separate queries.

In another example embodiment, a prioritized query tree includes five levels of search query priority including in descending priority: (1) all concrete words together in one query; (2) merged prepositional chunks and merged noun chunks; (3) prepositional chunks pre-merger and noun chunks pre-merger; (4) individual concrete words not covered in previous search queries (e.g., an OR query of all the concrete words); and (5) if an anchor word is given for a block of text, if an anchor word is given use the anchor word in conjunction will all other words that are the same part of speech as the anchor word, and if no anchor word is given, combine the concrete words and other words in the sentence that have the same part of speech as each of the concrete words.

In block 524, application 105 searches an image repository by traversing the prioritized query tree advancing from one level of the tree to the next as needed based on a threshold of required image search results. In block 526, application 105 receives image search results and counts the number of images from each of the search results.

Figure 6:
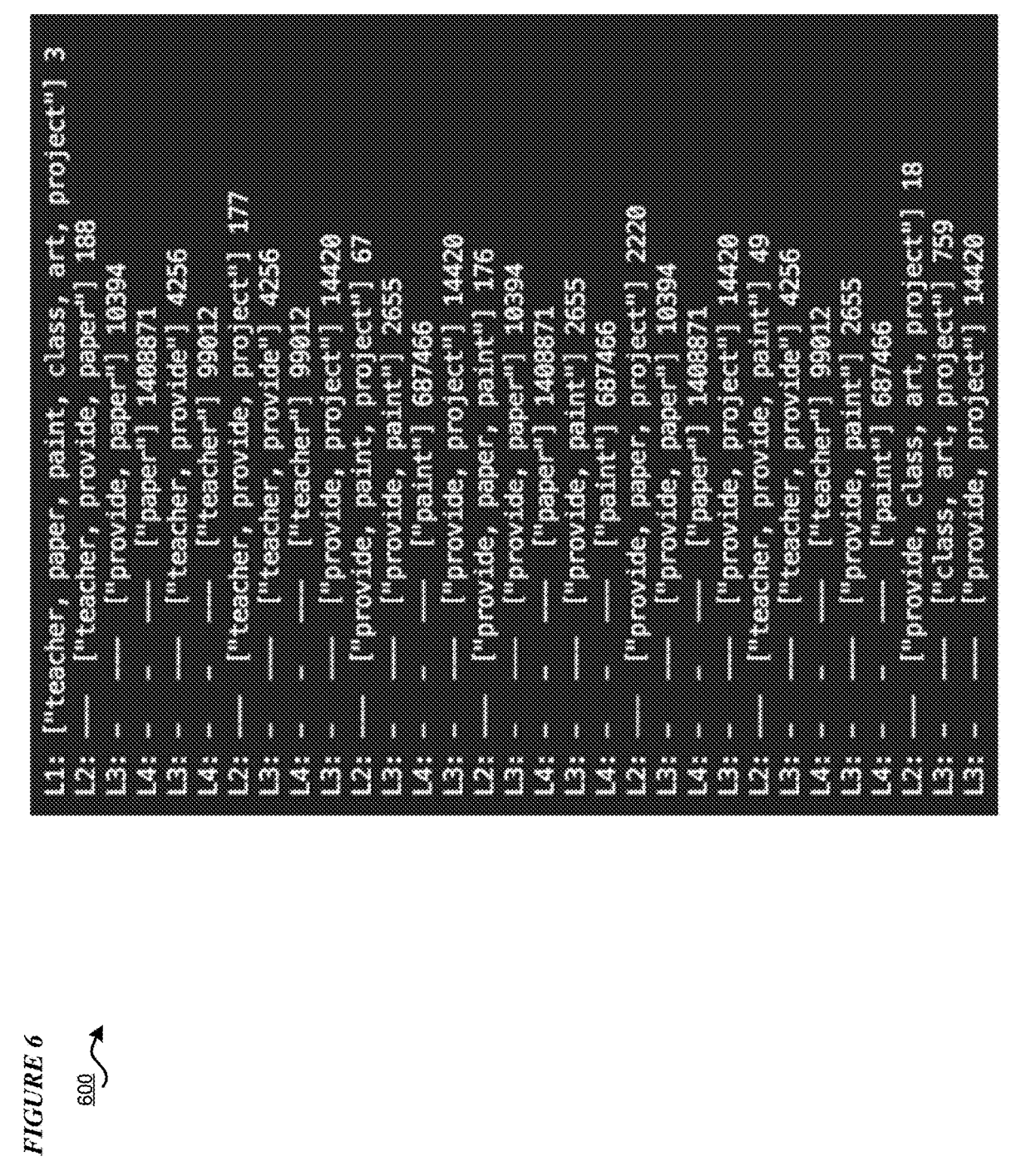

With reference now to FIG. 6, this figure depicts an example prioritized query tree 600 for a sentence in accordance with an illustrative embodiment. For the example sentence of "The teacher provides the paper and paint for the class art project.", the prioritized query tree 600 represents a prioritized list of search terms (L1 referring to Level 1, L2 referring to Level 2, etc.) to search for the given sentence within an image repository in which indentation is a demarcation for tree levels. At the end of the line for every search term, a number is shown that indicates the number of images found when searching a given image repository. If a predetermined threshold number of images (e.g., 200 images), the tree traversal stops at the level in which the predetermined threshold number or more images are found. In the example of FIG. 6, for a threshold value set to 200, the tree traversal stops a level 2 (L2).

Returning again to FIG. 5, in block 528 application 105 determines one or more representative images for visualizing the concept and/or context of the text portion from the image search results. In an embodiment, the one or more representative images are determined from the search results by a user. In another embodiment, application 105 determines the one or more representative images from the search results using a machine learning algorithm to determine the one or more representative images that visualize the concept and/or context of the text portion. In block 530, application 105 outputs the one or more representative images. Process 500 then ends. Although various embodiments are described with respect to searching and retrieval of image data to visual a portion of text, it should be understood that in other embodiments any type of media may be searched and retrieved to visualize the portion of text such as video data.

Figure 8:
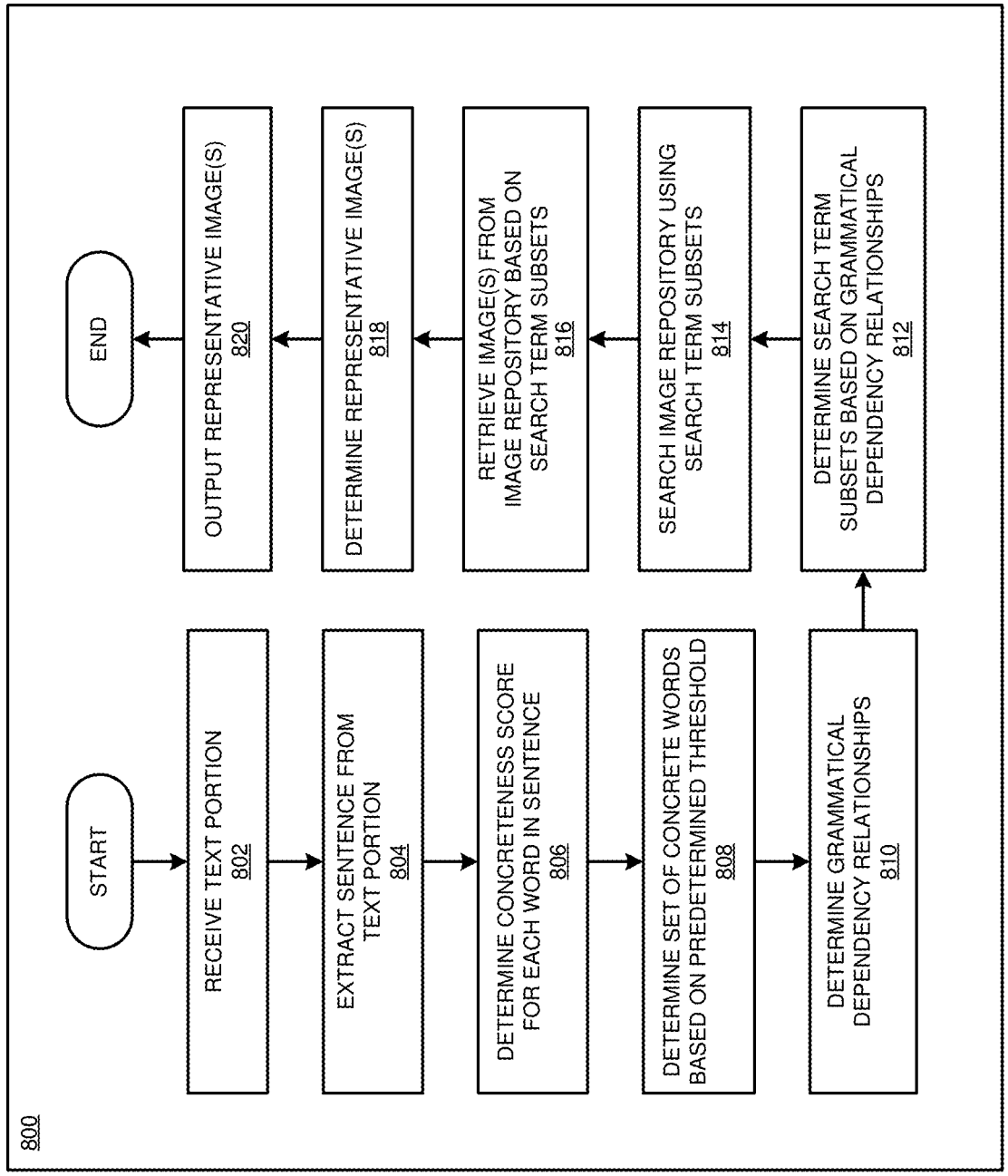
FIG. 8 depicts a flowchart of another example process for image search and retrieval to visualize text using identified grammatical dependency relationships in accordance with an illustrative embodiment.

With reference to FIG. 8, this figure depicts a flowchart of another example process 800 for image search and retrieval to visualize text using identified grammatical dependency relationships in accordance with an illustrative embodiment.

In block 802, application 105 receives a portion of text including textual information representing a concept and/or context which is desired to be visualized by one or more images. In block 804, application 105 extracts a sentence from the text portion in which the sentence includes one or more words. In block 806, application 105 determines a concreteness score for each word in the sentence.

In block 808, application 105 determines a set of concrete words from the words of the sentence based upon a comparison of the concreteness score for each word in the sentence to a predetermined concreteness score threshold value. In one or more embodiments, application 105 determines whether the concreteness score for a word is above the predetermined concreteness score threshold, and determines the set of concrete words based on the concreteness scores wherein each member of the set of concrete words is a word from the sentence having a concreteness score above the predetermined threshold.

In block 810, application 105 determines a grammatical dependency relationship of the words within the sentence. In block 812, application 105 determines one or more search term subsets based upon the grammatical dependency relationship, in which each member of the one or more subsets is a member of the set of concrete words, and wherein application 105 determines the one or more search term subsets based upon the grammatical dependency relationship of the words within the sentence. In one or more embodiments, the search term subsets include a prioritized query tree.

In block 814, application 105 searches an image repository using the search term subsets. In an embodiment, application 105 searches the image repository by traversing the prioritized query tree advancing from one level of the tree to the next as needed based on a threshold of required image search results. In block 816, application 105 retrieves one or more images from the image repository based on the one or more search term subsets.

In block 818, application 105 determines one or more representative images for visualizing the concept and/or context of the text portion from the image search results while adhering to the contextual and/or semantic meaning of the text portion. In an embodiment, the one or more representative images are determined from the search results by a user. In another embodiment, application 105 determines the one or more representative images from the search results using a machine learning algorithm to determine the one or more representative images that visualize the concept and/or context of the text portion while adhering to the contextual and/or semantic meaning of the text portion. In block 820, application 105 outputs the one or more representative images. Process 800 then ends.

Thus, a computer implemented method, system or apparatus, and computer program product are provided in the illustrative embodiments for image search and retrieval to visualize text using identified grammatical dependency relationships and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   extracting, by a processor, a sentence from a portion of text, the sentence including one or more words;
   calculating a concreteness score for each word of the one or more words in the sentence to indicate how visualizable said each word is;
   computing a set of concrete words based upon a comparison of the concreteness score for each word and a predetermined threshold; determining a grammatical dependency relationship between the one or more words of the sentence;

computing one or more subsets of search terms based upon the grammatical dependency relationship, wherein each member of the one or more subsets of search terms is a member of the set of concrete words;

retrieving media from a repository based on the one or more subsets of search terms;

wherein determining the grammatical dependency relationship further includes determining one or more of a noun phrase from the words of the sentence or a prepositional phrase from the words of the sentence;

wherein determining the one or more subsets of search terms further comprises: constructing a prioritized query tree based upon one or more of the noun phrases or the prepositional phrases;

wherein retrieving the media from the repository further comprises: searching the repository by traversing the prioritized query tree based on a threshold number of search results; and receiving, responsive to the searching, one or more search results from the repository.

2. The computer-implemented method of claim 1, wherein determining the set of concrete words further comprises:

determining that the concreteness score for a word is above the predetermined threshold value; and determining the set of concrete words based on the concreteness scores for a word from the sentence having a concreteness score above the predetermined threshold.

3. The computer-implemented method of claim 1, further comprising: identifying at least one word of the noun phrase as being found in the set of concrete words.

4. The computer-implemented method of claim 1, further comprising: identifying at least one word of the prepositional phrase as being found in the set of concrete words.

5. The computer-implemented method of claim 1, further comprising: merging an overlap of the noun phrase and the prepositional phrase into a merged phrase.

6. The computer-implemented method of claim 5, wherein merging the overlap of the noun phrase and the prepositional phrase further includes substituting a portion of the prepositional phrase with a portion of the noun phrase.

7. The computer-implemented method of claim 1, further comprising:

determining a representative media from the one or more search results, the representative media corresponding to a contextual meaning of the portion of text.

8. The computer-implemented method of claim 1, wherein the media includes one or more images.

9. A computer usable program product comprising one or more computer-readable storage devices, and program instructions stored on at least one of the one or more storage devices, the stored program instructions comprising:

program instructions to extract, by a processor, a sentence from a portion of text, the sentence including one or more words;

program instructions to calculate a concreteness score for each word of the one or more words in the sentence to indicate how visualizable said each word is;

program instructions to compute a set of concrete words based upon a comparison of the concreteness score for each word and a predetermined threshold;

program instructions to determine a grammatical dependency relationship between the one or more words of the sentence;

program instructions to one or more subsets of search terms based upon the grammatical dependency relationship, wherein each member of the one or more subsets of search terms is a member of the set of concrete words;

program instructions to retrieve media from a repository based on the one or more subsets of search terms;

wherein the program instructions to determine the grammatical dependency relationship further includes program instructions to determine one or more of a noun phrase from the words of the sentence or a prepositional phrase from the words of the sentence;

wherein the program instructions to determine the one or more subsets of search terms further comprises: program instructions to construct a prioritized query tree based upon one or more of the noun phrases or the prepositional phrases;

wherein program instructions to retrieve the media from the repository further comprises: program instructions to search the repository by traversing the prioritized query tree based on a threshold number of search results; and receiving, responsive to the search, one or more search results from the repository.

10. The computer usable program product of claim 9, wherein the program instructions to determine the set of concrete words further comprises:

program instructions to determining that the concreteness score for a word is above the predetermined threshold value; and program instructions to determine the set of concrete words based on the concreteness scores for a word from the sentence having a concreteness score above the predetermined threshold.

11. The computer usable program product of claim 9, further comprising: program instructions to identify at least one word of the noun phrase as being found in the set of concrete words.

12. The computer usable program product of claim 9, further comprising: program instructions to identify at least one word of the prepositional phrase as being found in the set of concrete words.

13. The computer usable program product of claim 12, wherein the program instructions to merge the overlap of the noun phrase and the prepositional phrase further includes program instructions to substitute a portion of the prepositional phrase with a portion of the noun phrase.

14. The computer usable program product of claim 9, wherein the computer usable code is stored in a computer readable storage device in a data processing system, and wherein the computer usable code is transferred over a network from a remote data processing system.

15. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to extract, by the one or more processors, a sentence from a portion of text, the sentence including one or more words;

program instructions to calculate a concreteness score for each word of the one or more words in the sentence to indicate how visualizable said each word is;

program instructions to compute a set of concrete words based upon a comparison of the concreteness score for each word and a predetermined threshold;

program instructions to determine a grammatical dependency relationship between the one or more words of the sentence;

program instructions to compute one or more subsets of search terms based upon the grammatical dependency relationship, wherein each member of the one or more subsets of search terms is a member of the set of concrete words;

program instructions to retrieve one or more images from a repository based on the one or more subsets of search terms;

wherein the program instructions to determine the grammatical dependency relationship further includes program instructions to determine one or more of a noun phrase from the words of the sentence or a prepositional phrase from the words of the sentence;

wherein the program instructions to determine the one or more subsets of search terms further comprises: program instructions to construct a prioritized query tree based upon one or more of the noun phrases or the prepositional phrases;

wherein program instructions to retrieve the media from the repository further comprises: program instructions to search the repository by traversing the prioritized query tree based on a threshold number of search results; and receiving, responsive to the search, one or more search results from the repository.

\* \* \* \* \*